Jan. 2, 1934.  A. B. WINCHELL  1,942,158
CLUTCH OPERATING MECHANISM
Original Filed Sept. 28, 1931  2 Sheets-Sheet 2

INVENTOR
Arthur B. Winchell
BY Ira J. Adams
ATTORNEY

Patented Jan. 2, 1934

1,942,158

UNITED STATES PATENT OFFICE 1,942,158

CLUTCH OPERATING MECHANISM

Arthur B. Winchell, Jackson, Mich., assignor, by mesne assignments, to Radio Corporation of America, New York, N. Y., a corporation of Delaware Original application September 28, 1931, Serial No. 565,468. Divided and this application April 21, 1932. Serial No. 606,549

15 Claims. (Cl. 192—117)

This invention relates to clutches and operating mechanism therefor.

An object of the invention is to provide arrangements for machines such as phonographs that will insure quick opening of the clutch at the correct time.

Another object is to provide for such opening of the clutch by energy stored by the moving mechanism before the clutch is opened with means to release the stored energy to quickly open the clutch.

Another object is to employ means to hold the clutch closed until the stored energy is released for opening the clutch.

Other objects will appear in the specification, reference being had to the drawings in which:

Fig. 3 is a perspective view of the clutch operating lever.

Fig. 4 is a perspective view of the throw-out lever used to move the clutch lever.

Figure 1:
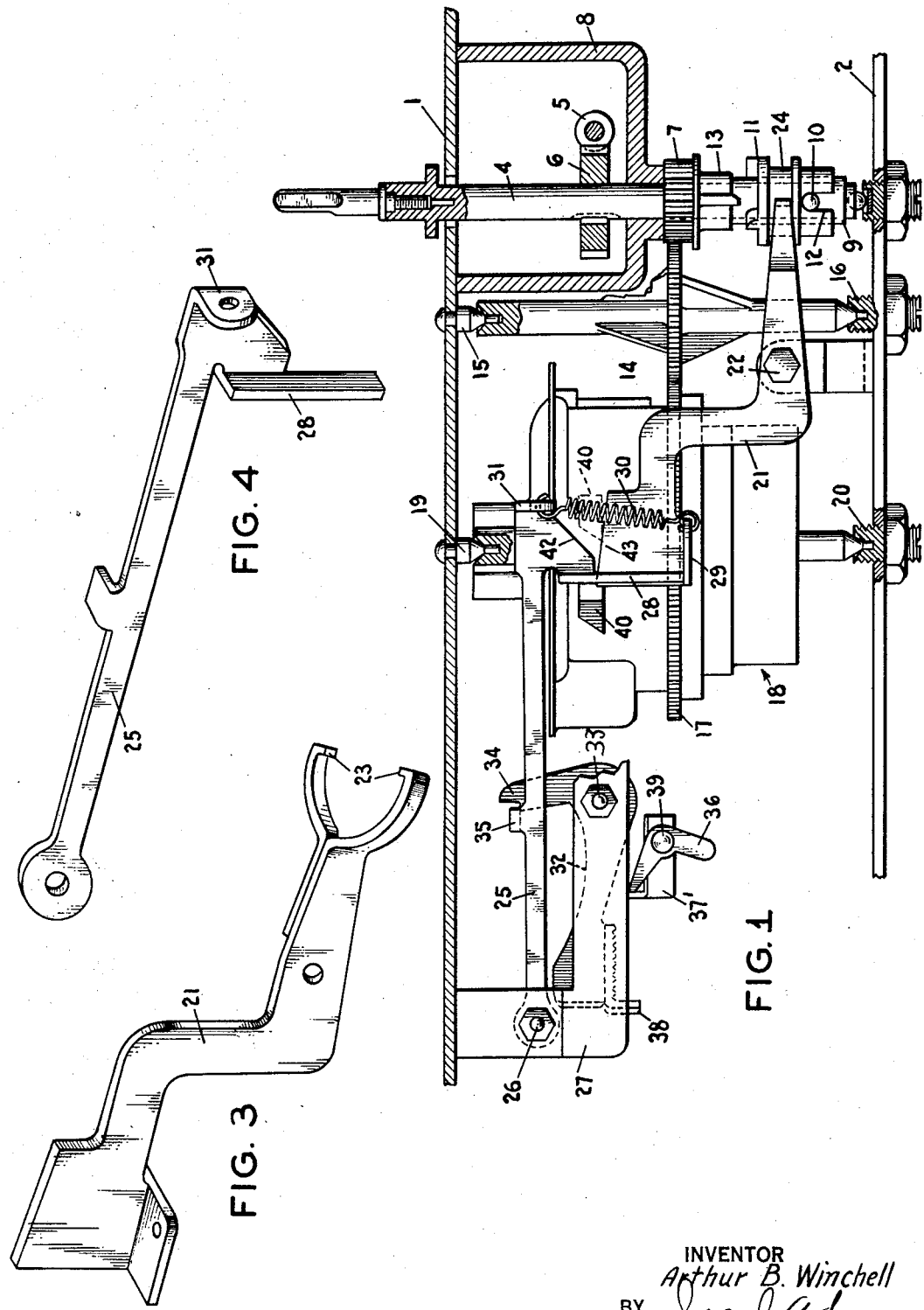
Fig. 1 is a sectional view through a portion of a phonograph mechanism with which the clutch is associated, parts of the motor being omitted.
Figure 2:
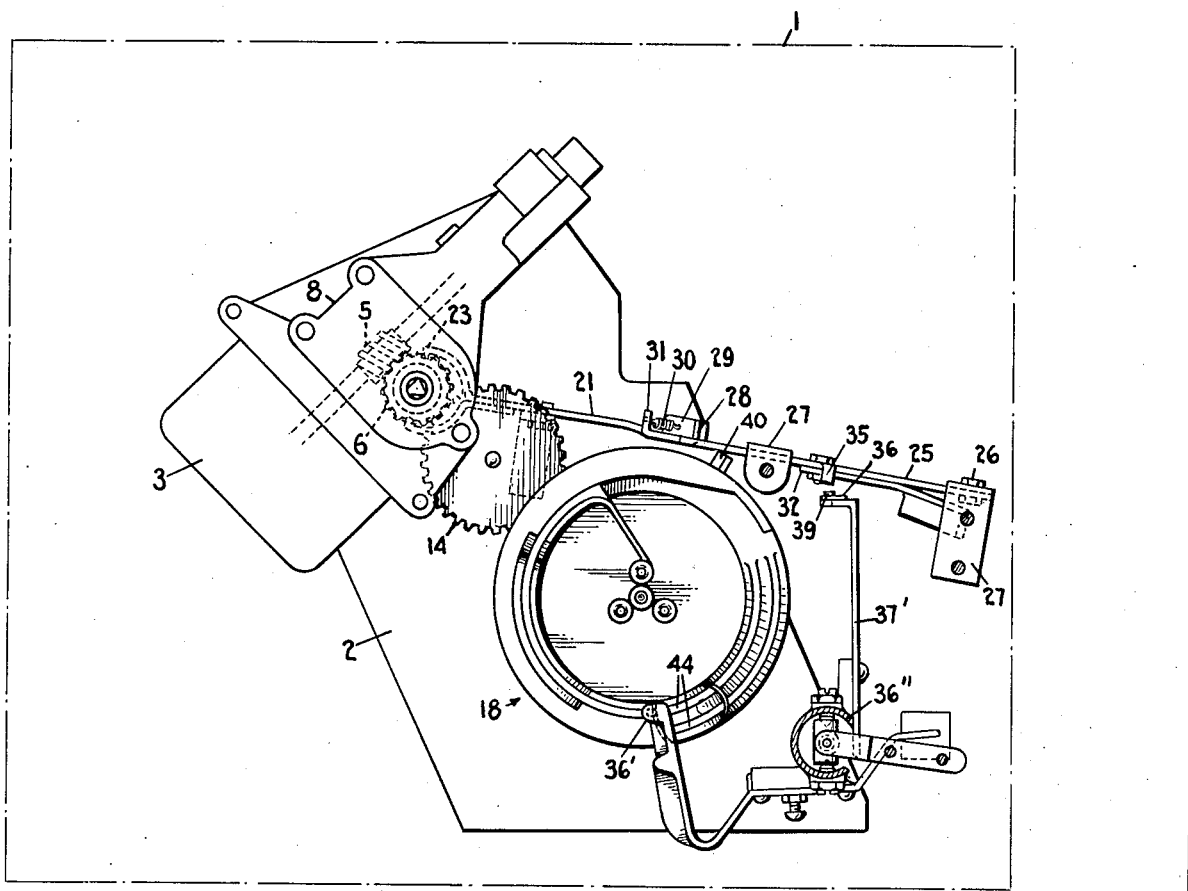
Fig. 2 is a plan view of the mechanism shown in Fig. 1.

This invention may be useful in various machines, but for illustrative purposes the clutch and associated parts have been shown in connection with an automatic phonograph adapted to play a supply of records one after another. In the drawings only enough parts of the automatic phonograph are shown to illustrate the use of the clutch and the operating mechanism.

Referring to Fig. 1, the phonograph parts are mounted between a top plate 1 and a bottom plate 2, the devices for holding these two plates in spaced rigid relation not being shown herein as they form no part of the invention. The motor 3 is geared to turntable shaft 4 through worm 5 and gear 6. On this shaft a pinion 7 is journalled between the bottom of the gear casing 8 and sleeve 9 fastened to the lower part of the shaft by pin 10. When the clutch member 11 is raised its teeth engage the teeth of the clutch part 13 integral with the lower part of gear 7.

Intermediate gear 14 is journalled at 15 and 16 in the top and bottom plates respectively. This gear meshes with the pinion 7 and with another gear 17 fastened to a cam member 18 journalled at 19 and 20 in the top and bottom plates. The foregoing arangement is such that when the clutch member 11 is in engagement with the clutch member 13 the motor 3 revolves the cam member and produces certain record changing operations.

The clutch member 11 is moved by clutch lever 21 pivoted at 22. This clutch lever has prongs 23 (Fig. 3) that fit into groove 24 of the clutch member 11. A throw-out lever 25 is pivoted at 26 to a supporting bracket 27. The opposite end of this lever has a standard or abutment 28 held in engagement with a shelf 29 on clutch lever 21 by means of a spring 30 secured to ear 31 and to said shelf 29.

A trip lever 32 is pivoted at 33 to the bracket 27, one end of the bracket being broken away in Fig. 1. A catch 34 on this lever engages a lug 35 on the throw-out lever 25. When these parts are in engagement the throw-out lever maintains the clutch in open position through the tension of spring 30.

The trip lever 32 is tripped by one of two different mechanisms, one only of which needs to be described here. Follower arm 36' is attached to pickup arm 36" and to such arm the lever 37' is also attached. As the pickup arm moves in playing the record the lever arm 37' finally brings trip dog 36 into engagement with the projection 38 on the trip lever 32. This raises the trip lever due to the pivoting of the trip dog on its axis 39 and the part 34 is moved to free the projection 35. This brings the clutch part 11 into engagement with the clutch part 13 by the unbalanced weight of the levers 25 and 21 or by the tension of the spring 30 since the tension is relieved by downward motion of the levers 25 and 21. The apparatus may be designed so that either of these forces, or both combined, may close the clutch. The motor is thus connected through the gears to the cam member 18 and the latter rotates and performs certain record changing operations that need not be described. This cam member 18 makes one complete revolution whereupon the wedge or cam member 40 on the main cam 18 moves into the position shown in dotted lines in Fig. 1. Finally, the wedge engages the slanting surface 42 and revolves the throw-out lever about its pivot point 26 until the catch 33 engages the projection 35. This energizes spring 30 because the clutch lever 21 is prevented from rising by the engagement of the slanting surface 43 with the bottom of the wedge 40. This wedge therefore holds the clutch lever down and clutch closed even though the throw-out lever 25 has been set to clutch opening position. As the cam continues to rotate the wedge finally clears the slanting surface 43 of the clutch lever and the tension of the spring 30 immediately snaps the clutch open. It will thus be seen that the mechanism resets the parts for holding the clutch open while the clutch is still in closed position, and that the clutch is not opened until after this takes place, when the mechanism has reached the proper point for disengagement.

The follower arm 36' engages grooves 44 and moves the pickup arm 36" and the lever arm 37' back to the position shown in Fig. 1 and a new cycle of operation then takes place.

The complete mechanism of the phonograph and associated clutch parts is shown in my copending application filed September 28, 1931, Serial No. 565,468, of which this is a division and some of the broader aspects of the invention are also illustrated and described in my other copending application filed April 26, 1930, Serial No. 447,480. The claims in this case are directed to the clutch operating mechanism, the remaining features being claimed in the copending cases referred to.

Having described my invention, what I claim is:

1. In clutch mechanism, a driving member, a driven member, a clutch between said members, means operated by one of said members to store up energy to operate said clutch, additional means operated by one of said members to prevent the desired movement of the clutch while said energy is being stored and permit the operation of said clutch only at a predetermined time in the movement of one of said members.

2. In clutch mechanism, a power shaft, a part adapted to be driven thereby, a clutch connecting the shaft to said part, means to open said clutch including a spring, means operated by said part to place tension on said spring and hold the clutch closed until a predetermined point in the movement of said part is reached.

3. In clutch mechanism, a rotatable driving member, a driven member adapted to be rotated thereby, a clutch between said members, means operated by the driven member to store up energy to open said clutch, additional means to hold the clutch closed until said energy is being stored and to release the energy to open the clutch at a predetermined point in the rotation of the driven member.

4. In clutch mechanism, a driving shaft, a driven shaft, a clutch between the shafts, a spring connected to the clutch, means operated by the driven shaft to energize said spring and means to hold the clutch closed while the first mentioned means is energizing said spring.

5. In clutch mechanism, a driving shaft, a driven shaft, a clutch between the shafts, a lever connected to said clutch, a second lever, a spring connected between said levers, means connected to said driven shaft to move the second lever and energize said spring, and means to hold the first lever immovable until the driven shaft has rotated to a predetermined point and thereupon permit the spring to open the clutch.

6. In clutch mechanism, a driving shaft, a driven shaft, a clutch between the shafts, a lever connected to said clutch, a second lever adapted to place stress on the first lever for closing the clutch, a spring connected to the first lever to open the clutch, and means to move the second lever to remove the said stress on the first lever and permit the spring to open the clutch.

7. In clutch mechanism, a driving shaft, a driven shaft, a clutch between the shafts, a lever connected to said clutch, a second lever adapted to move the first lever for closing the clutch, means driven by the second shaft to move the second lever to relieve the stress on the first lever and means to hold the first lever in clutch closing position while the first lever is being moved.

8. In clutch mechanism, a driving shaft, a driven shaft, a clutch between the shafts, a lever connected to said clutch, a second lever adapted to place stress on the first lever for closing the clutch, a spring connected to the first lever to open the clutch, means driven by the second shaft to move the second lever, and means to hold the first lever in clutch closing position while the first lever is being moved.

9. In clutch mechanism, a driving shaft, a driven shaft, a clutch between the shafts, a lever connected to said clutch, a second lever adapted to engage the first lever and move it in clutch closing position, a spring between the said levers and a cam operated by the driven shaft to force said levers apart and place stress on said spring.

10. In clutch mechanism, a driving shaft, a driven shaft, a clutch between the shafts, a lever connected to said clutch, a second lever adapted to engage the first lever and move it in clutch closing position, a spring between the said levers and a cam operated by the driven shaft to force said levers apart to energize said spring after a predetermined movement of the driven shaft.

11. In clutch mechanism, a motor, a clutch connected to the motor, a pivoted lever engaging with the movable member of said clutch, a second lever having one end extending past the free end of the first mentioned lever and a spring tending to move said two ends toward each other.

12. In clutch mechanism, a motor, a cam, a clutch between the motor and the cam, a pivoted lever engaging the movable member of said clutch, a pivoted lever having one end extending past the free end of the first mentioned lever, a spring connected to the two levers tending to hold them together, and a projection on said cam adapted to be moved between the ends of the two levers to separate them and put tension on said spring.

13. In clutch mechanism, a motor, a cam, a clutch between the motor and cam, a pivoted lever engaging the movable member of said clutch, a pivoted lever having one end extending past the free end of the first mentioned lever, a spring connected to the two levers tending to hold them together, and a trip lever engaging the second mentioned lever to hold it in one of its positions.

14. In clutch mechanism, a motor, a rotatable member, a clutch between the motor and said member, a pivoted lever engaging with the movable part of said clutch, a second lever having one end extending over the free end of the first lever, a cam on said member adapted to move between the two levers and hold the first lever with the clutch closed while moving the second lever, and a spring between the two levers adapted to snap the clutch open as soon as the same cam passes from between the levers.

15. In clutch mechanism, a motor, a rotatable member, a clutch between the motor and said member, a pivoted lever engaging with the movable part of said clutch, a second lever having one end extending over the free end of the first lever, a cam on said member adapted to move between the two levers and hold the first lever with the clutch closed while moving the second lever, and a spring between the two levers adapted to snap the clutch open as soon as the said cam passes from between the levers, and a third pivoted lever adapted to engage and hold the second lever in the adjusted position.

ARTHUR B. WINCHELL.